Patented July 23, 1940

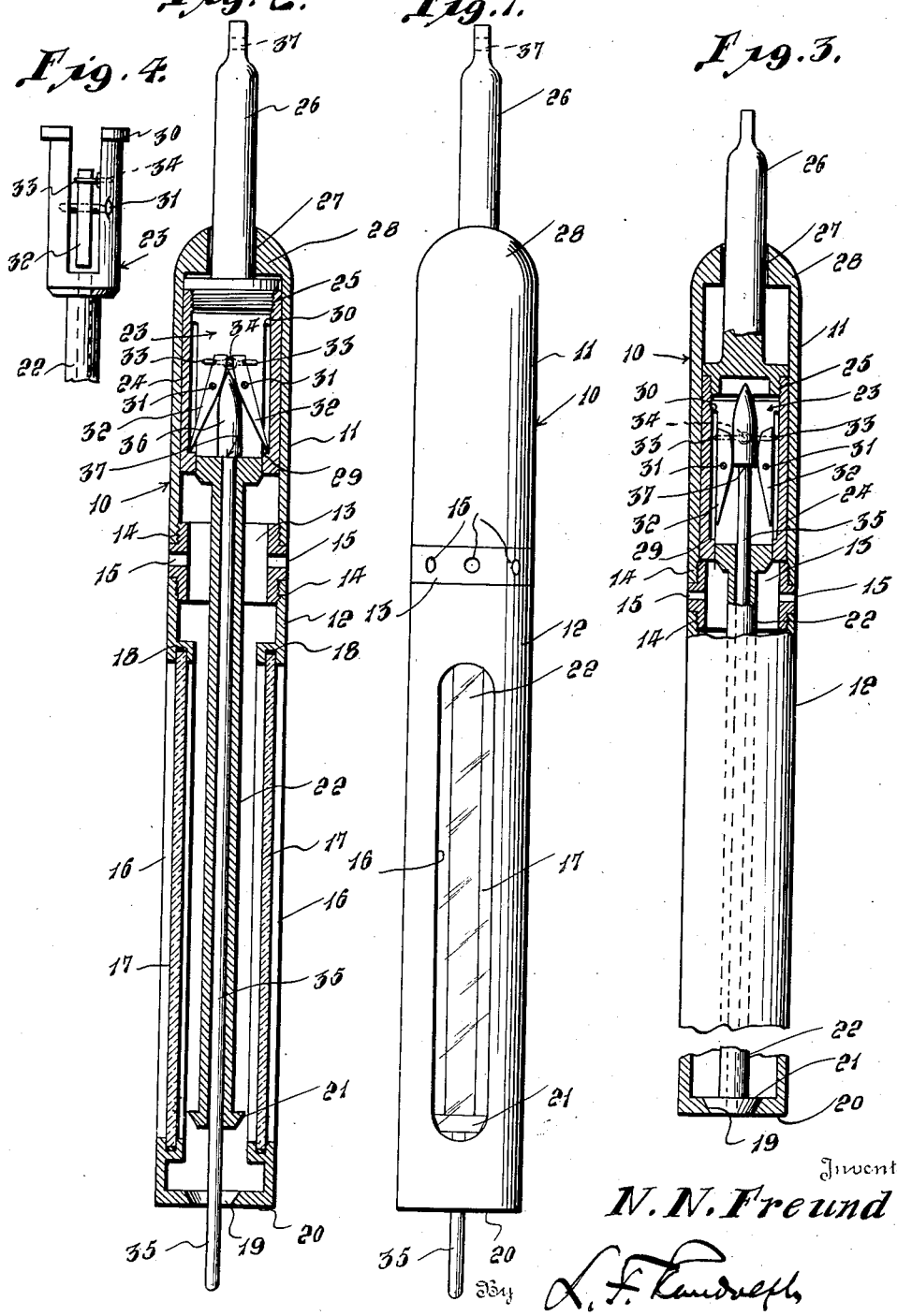

2,209,262

UNITED STATES PATENT OFFICE 2,209,262

TANK GAUGE

Nicklous N. Freund, McHenry, Ill.

Application August 24, 1939, Serial No. 291,763

5 Claims. (Cl. 137—18)

This invention relates to a device for determining the kind and nature of substances in the bottoms of tanks, such as water in the bottom of an oil tank, or any other material which will settle from the oil to the bottom, or the equivalent.

It is particularly aimed to provide a construction adapted to be lowered into the liquid within the tank in an open position and to automatically close upon striking the bottom so that a portion of the contents of the tank adjacent the bottom may be withdrawn for inspection and determination.

The more specific objects and advantages will become apparent from a consideration of the description following taken in connection with accompanying drawing illustrating an operative embodiment.

In said drawing:

Figure 1 is a view in elevation showing the improved device;

Figure 2 is a substantially central longitudinal sectional view through the device, with the parts in position to receive a portion of the material to be removed from the tank;

Figure 3 is a view substantially similar to Figure 2, but with the parts in closed position for removal from the tank, and Figure 4 is a detail elevation showing the cage of the valve member at a right angle to the position of Figure 2.

Referring specifically to the drawing wherein like reference characters designate like or similar parts, the device employs a barrel generally designated 10 and consisting of upper and lower tubular sections 11 and 12, separably connected together by a coupling 13, preferably threaded to the sections as at 14. By having the sections separable, various parts of the device may be inserted and removed from the barrel. The coupling 13, preferably has one or more radial vents as at 15, so that air may escape from the same.

Lower section 12 preferably has one or more windows as at 16 covered with transparent material such as glass, Celluloid, synthetic resin or the like at 17, sealed in place by means of watertight joints at 18.

The lower section 12 has a valve opening 19 in its lower end wall 20, which is tapered as shown to form a valve seat.

Said seat 19 is adapted to be closed by a valve member 21 carried by a slidable tubular stem 22 located longitudinally of the barrel and having at its upper end, a bifurcated cage 23.

Said cage 23 is located within a thimble 24 slidable within the barrel and detachably screw threaded as at 25, to a suspending element 26, passing slidably through an opening 27 in the top or head 28 of the upper section 11.

Said thimble adjacent the lower end, and on the interior, has arcuate inwardly extending flanges or shoulders as at 29. The cage at the upper end as at 30 has outwardly extending flanges, which may be arcuate as shown, disposed in line with the shoulders 29.

Pivoted to the cage 23 as on transverse screws or other pins 31, are trip members 32 which are engaged at their upper ends by contractile ends or hooks 33 of a bracket of resilient material fastened as at 34 to the cage. The action of the spring members 30 spreads the lower ends of the trip members so that they will rest on the shoulders 29 as shown in Figure 2. Because of such action, the valve 21 will normally be retained in open position.

A retracting member primarily in the form of a slidable rod 35 passes centrally through the stem 22, valve 21 and lower portion of the cage 23 and it has a head 36, whose lower end at 37 forms a shoulder normally resting on the lower portion of the cage 23.

Presuming operation, a cord, cable or the like is connected in an eye 37 at the upper end of the suspending element 26 and the device is lowered as a whole into the barrel having the liquid or material to be withdrawn. Such device is lowered and the lower end of the rod 35, which extends below the barrel section 12, will strike the bottom of the tank or other receptacle, and material adjacent such bottom will enter the barrel through the opening 19. Such contact of the lower end of rod 35 with the tank will result in upward movement of the rod while downward movement of the barrel continues and hence the head 36 will pass between the upper ends of the trip members 32, retracting them off of the shoulders 29 as in Figure 3, whereupon the valve 21 will be released or free to slide downwardly into closing engagement with the seat or opening 19, retaining a quantity of the material adjacent the bottom of the tank, within the barrel. The openings 15 enable the escape of any air which is trapped behind or with material retained in the barrel. The closed position of the valve is shown in Figure 3, as well as the retracted position of the trips 32.

Various changes may be resorted to provided they fall within the spirit and scope of the invention.

I claim as my invention:

1. A device of the class described comprising a barrel, a thimble slidable in the barrel adapted for connection of a suspending element thereto, an entrance opening at the lower end of the barrel, a valve operable to close said opening, means associated with the valve including trip mechanism engageable with the thimble to hold the valve in open position, and means extending below the barrel displaceable through lowering of the barrel to retract the trip mechanism so that the valve may close said opening.

2. A device of the class described comprising a barrel, a thimble slidable in the barrel adapted for connection of a suspending element thereto, an entrance opening at the lower end of the barrel, a valve operable to close said opening, means associated with the valve including trip mechanism engageable with the thimble to hold the valve in open position, means extending below the barrel displaceable through lowering of the barrel to retract the trip mechanism so that the valve may close said opening, said trip mechanism comprising a pair of trip members, spring means urging spreading of said members at their lower ends, said thimble having interior shoulders engageable by the spread trip members.

3. A device of the class described comprising a barrel, a thimble slidable in the barrel adapted for connection of a suspending element thereto, an entrance opening at the lower end of the barrel, a valve operable to close said opening, means associated with the valve including trip mechanism engageable with the thimble to hold the valve in open position, means extending below the barrel displaceable through lowering of the barrel to retract the trip mechanism so that the valve may close said opening, said barrel being sectional, a coupling connecting the sections, and said coupling having an opening for the escape of air from the interior of the barrel.

4. A device of the class described comprising a barrel, a thimble slidable in the barrel adapted for connection of a suspending element thereto, an entrance opening at the lower end of the barrel, a valve operable to close said opening, means associated with the valve including trip mechanism engageable with the thimble to hold the valve in open position, means extending below the barrel displaceable through lowering of the barrel to retract the trip mechanism so that the valve may close said opening, and said barrel having a watertight window through which the contents may be observed.

5. A device of the class described comprising a barrel having an entrance opening in its lower end, a suspending element extending into the barrel, a thimble slidable within the barrel detachably connected to said suspending element, a cage within the thimble, a valve suspended from the cage adapted for closing engagement with said opening, said thimble having inwardly extending shoulders, trip members pivoted to the cage, spring means adjacent the upper end of the trip members urging spreading thereof at their lower ends so as to engage said shoulders to hold the valve in open position, a rod slidable within the valve having a head within the cage, said rod extending below the barrel so that it may be moved upwardly to spread the trip members to disengage said shoulders and permit closing movement of the valve.

NICKLOUS N. FREUND.